May 13, 1947.  LE GRAND DALY  2,420,522
METHOD OF MAKING ARTICLES FROM PLASTIC TREATED MATERIALS
Filed March 9, 1942  6 Sheets-Sheet 1
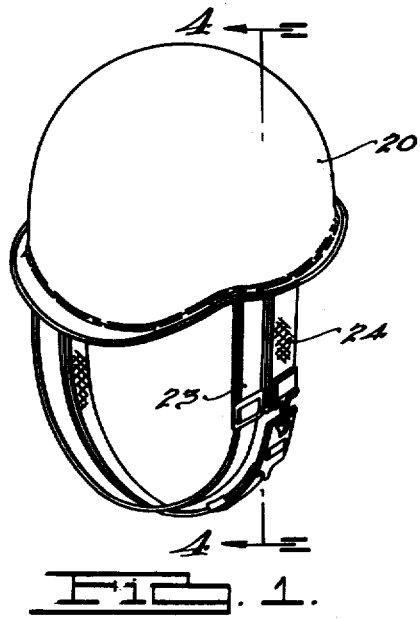
FIG. 1.
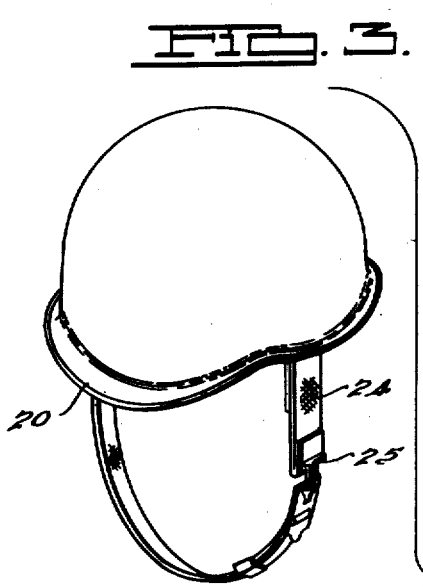
FIG. 3.
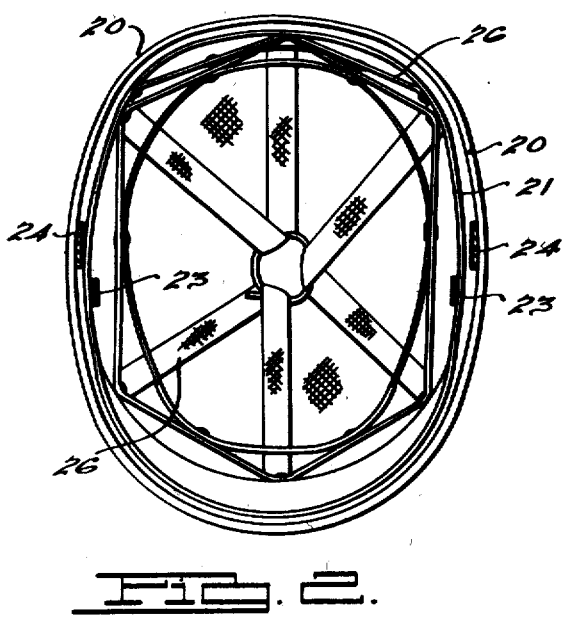
FIG. 2.
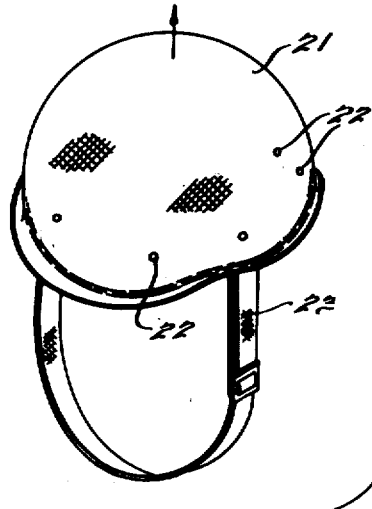
INVENTOR
Le Grand Daly.
BY
Gregory S. Dolgorukof
ATTORNEY May 13, 1947.                LE GRAND DALY                2,420,522
METHOD OF MAKING ARTICLES FROM PLASTIC TREATED MATERIALS
Filed March 9, 1942                6 Sheets-Sheet 2

INVENTOR
Le Grand Daly.
BY
Gregory S. Dolgorukov
ATTORNEY

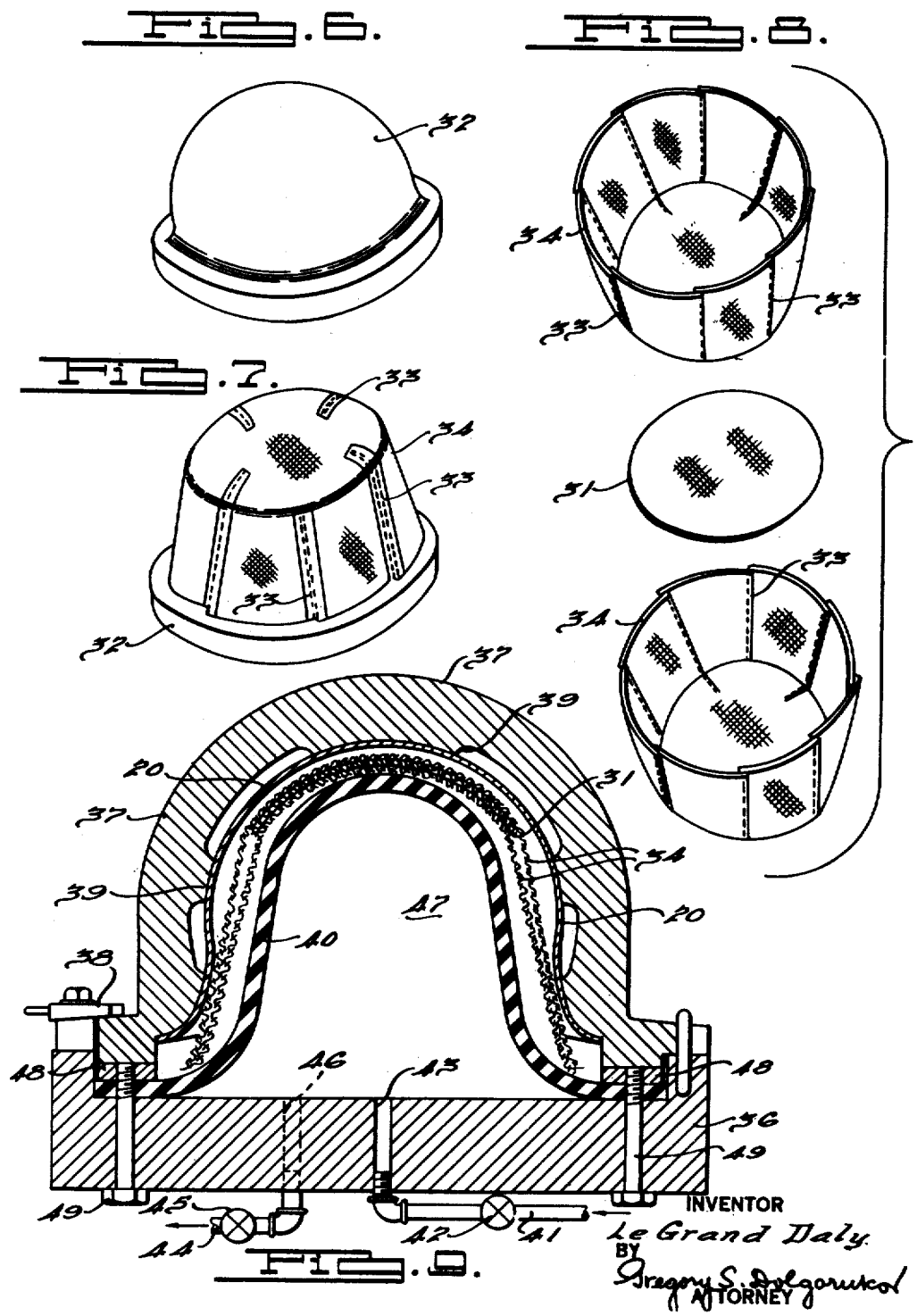

May 13, 1947.  LE GRAND DALY  2,420,522
METHOD OF MAKING ARTICLES FROM PLASTIC TREATED MATERIALS
Filed March 9, 1942  6 Sheets-Sheet 4
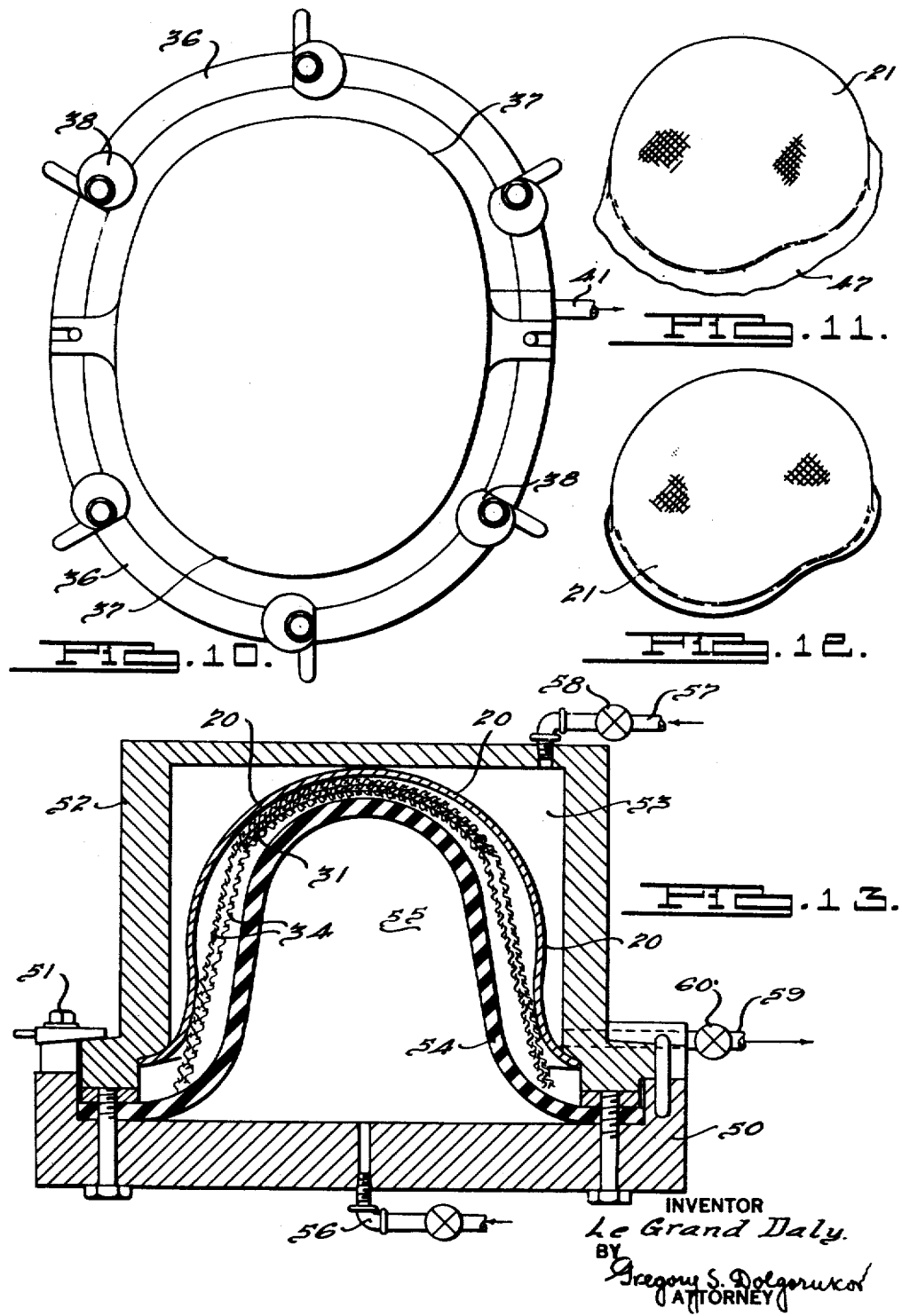
INVENTOR
Le Grand Daly.
BY Gregory S. Dolgorukov
ATTORNEY

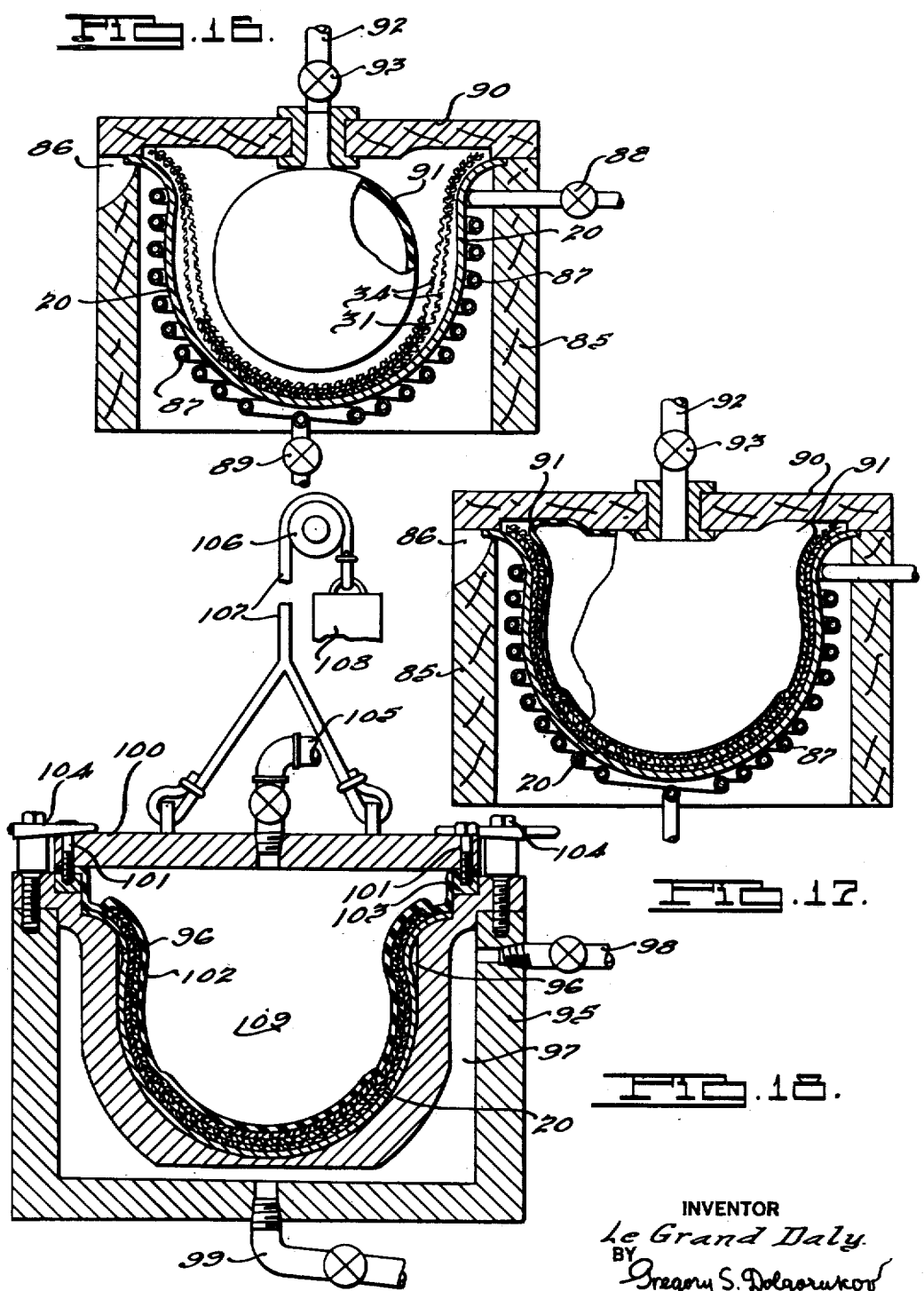

Patented May 13, 1947

2,420,522

UNITED STATES PATENT OFFICE 2,420,522

METHOD OF MAKING ARTICLES FROM PLASTIC TREATED MATERIALS

Le Grand Daly, Birmingham, Mich.

Application March 9, 1942, Serial No. 433,943

6 Claims. (Cl. 154—110)

This invention relates to molding methods and apparatus and more particularly to an improved method and apparatus for making various articles from plastic impregnated cloths or fabrics.

Heretofore considerable difficulties have been encountered in the art of making articles of the above general character and particularly in forming them to shapes including relatively deep "draws" or curved surfaces. Under one method of conventional practice of making such articles a flat sheet or a mat is first built-up of a desirable number of alternating layers of uncured plastic material and fabric; thereupon such flat sheet is operated upon in a die apparatus of a relatively powerful press and formed to desired shape between the correspondingly shaped punch and die of said apparatus, similarly to stamping metals. The die apparatus is usually heated in some suitable way in order to soften the plastic material and/or to effect curing thereof. Very high forming pressures such for instance as 5000 lbs. per square inch produced mechanically or hydraulically have been considered necessary to effect proper forming and molding, in consequence whereof molding dies have been usually made similar to the dies used for stamping metals, i. e. of heavy cast steel construction with hand shaped forming portions. Making such dies is a very tedious work requiring high skill and long time, and therefore in view of the high cost of molding dies and the necessity of using heavy powerful presses, setting-up for production even of a relatively small article of the foregoing character required relatively large investment and a long time. In addition to the above, still more serious difficulties have been confronted due to the fact that when the shape of the article produced included portions of considerable curvature or deep draws, damaging fibers of the reinforcing fabric in some sections of such curved portions and formation of folds or wrinkles in others were extremely difficult to avoid. The latter difficulty is due to the inability of cloth or of fabric fibers to stretch as much as it is necessary in order that a flat sheet of a fabric material would assume a curved shape. In other words, while stretching of metal fibers and "flow" of metal within a metal sheet during stamping is considerable and may be carried on practically indefinitely by alternating forming and annealing of the stamped blank, such stretching and "flow" of material cannot be achieved in fabrics, and forming operations on flat pieces of fabric reinforced plastic materials invariably result in severely damaging the fabric fibers, formation of folds, high percentage of scrap and production of articles of inferior quality, often at high cost.

One of the obects of the present invention is to decrease and largely eliminate the above difficulties and to provide an improved method for molding articles of the above described general character.

Another object of the invention is to provide an improved molding method with the aid of which fabric reinforced plastic articles or articles made of plastic treated fabrics may be molded without distorting the fabric or texture thereof, forming wrinkles and folds, weakening or breaking the fibers of the fabric; and which method also ensures that the fabric or cloth in the finished article retains its original strength.

A further object of the present invention is to provide an improved method for making various articles from plastic treated fabric materials, which articles do not have any sections internally weakened by the distortion of the fabric texture, which defects may not be apparent and may not be possible of visual detection.

A still further object of the present invention is to provide an improved method for making various articles from plastic impregnated fabric materials, which articles may be provided in desired places with additional local reinforcements of any desirable material.

A still further object of the invention is to provide an improved method for making various articles from the materials of the above described general character and having shapes making impossible to form them in molding dies of a single acting press due to the difficulties of withdrawing the die punch, and usually requiring multiple acting presses and very complicated dies.

A still further object of the present invention is to provide an improved method for making various articles from flat pieces of plastic covered or impregnated fabric or cloth, said method including an improved molding operation or step which can be easily effected in very simple apparatus and does not require making of special molding dies or use of large presses.

A still further object of the present invention is to provide an improved method of making various articles from materials of the foregoing general character in large quantities with deliveries to be made in the shortest possible time, such as may be necessary in emergencies or in time for seasonal sales and in similar situations where because of the present improved method manufacture of such articles may be easily and quickly organized without the necessity of large investments in molding dies, presses or other expensive machinery as well as without securing ample supply of skilled help for making the molding dies, setting the machinery for production and securing other facilities which may be either scarce or even entirely unavailable at a particular time or place.

A still further object of the invention is to provide an improved method of making plastic or plastic treated inlays for various articles, such for instance as for two-piece military helmets, which method does not require making specially shaped molding dies but in accordance with which the inlay receiving portion of the article itself, such for instance as the steel shell of a two-piece helmet, may be used as a mold.

A still further object of the present invention is to provide an improved method of making plastic or plastic impregnated articles which method permits molding and curing of such articles using relatively low pressures which, in turn, permits use of a mold of thin sheet metal structures or members, such for instance as an actual part of the article or its first sheet metal model, as may be the case in making parts of motor vehicle bodies and the like.

A still further object of the present invention is to provide an improved method for making plastic or plastic impregnated inlays for a helmet of military or other type which method enables producing such inlays fast and in large quantities with low initial investment in machinery.

A still further object of the present invention is to provide an improved method for making plastic or plastic impregnated inlays for helmets, which method is simple, may be carried out with the aid of very inexpensive apparatus, enables high capacity production, decreases scrap and enables use of semi-skilled and unskilled labor.

Other objects of this invention will appear in the following description and appended claims, reference being had to the accompanying drawings forming a part of this specification wherein like reference characters designate corresponding parts in the several views.

Fig. 1 is a perspective view illustrating a two-piece military helmet including a liner or inlay made in accordance with the present invention.

In making articles such as safety helmets attempts have been made to cut out pieces of plastic impregnated fabric in the shape forming a geometric development into the shape of the helmet, fitting the meeting edges of the piece into substantially abutting relationship. Several pieces of such a nature are then assembled, with staggering of their abutting joints, and the pieces are molded in the molding dies into a helmet. It has been found, however, that fitting the edges of such pieces is a tedious work and that shifting of such pieces in the mold may cause separation of some of such abutting joints in some places, folds and high spots in others. In consequence thereof, the high spots so produced are crushed by the dies, squeezing out the plastic and producing so-called "dry spots," or places with insufficient plastic bond and often damaged fibers, while in other places excessive resin accumulates in the so-called "resin pockets." The helmet or other article so produced is usually spotty in appearance, having light "dry spots" and dark "resin pockets," and its strength and shock-resisting capacity is decreased. Moreover, the abutting joints with "fitted" edges have very little strength, and if such joints are running to the very edge of the article, such as to the very edge of the brim of a safety helmet, such helmets often fail along such seams under relatively light shock loads. In addition, such joints in the edge of the brim of a safety helmet form places where separation of the bonded cloth pieces may originate.

A large amount of inventive effort has heretofore been directed by those skilled in the art to the solution of the above problem. It was proposed, for instance, to use a knit preform individually made for each article such as a helmet, which preform is easily stretchable to desired shape. However, the cost of knitting such preforms is relatively high, and in many cases it is prohibitive for production in moderate quantities or for experimental work, since it may require ordering such preforms from special mills and necessitate special set-up of machines for each special form. It was also proposed to use glass fiber fabrics of an open mesh weave and with fibers so slippery as to permit forming "deep draws" by distorting the weave. While such expedients have solved some of the above discussed problems, they have introduced new difficulties preventing wider acceptance of such proposals.

Fig. 2 is a bottom view of the helmet shown in Fig. 1, the chin straps thereof being cut away for the sake of clarity.

Fig. 3 is an exploded view showing separately the steel shell and the plastic inlay forming, when assembled, a complete helmet.

Fig. 6 is a perspective view showing a form block on which flat pieces such as those shown in Fig. 5 are conveniently folded to an approximate shape of the inlay.

Fig. 7 is a perspective view illustrating a star-shaped cloth piece folded on said block approximately to the shape of the inlay, with its seams or places of juncture being connected together.

Fig. 8 is an exploded perspective view illustrating cloth pieces of Fig. 5 folded together and ready to be assembled for molding.

Fig. 9 is a vertical sectional view of a mold for forming and curing the plastic inlay.

Fig. 10 is a top view of the mold shown in section in Fig. 9.

Fig. 11 is a perspective view illustrating a molded inlay blank as the same comes out of the mold.

Fig. 12 is a perspective view illustrating the inlay blank of Fig. 11 after the same has been properly trimmed.

Fig. 13 is a sectional view showing a mold of a modified construction for forming and curing the plastic inlay.

Figs. 16, 17 and 18 illustrate a modified step of molding the inlay, said step or operation being performed in two stages: first, by preforming the inlay, and second, by finally molding and curing the same. Particularly, Fig. 16 is a sectional view showing a preforming mold with the assembled inlay pieces operatively arranged therein but before the rubber ball is expanded.

Fig. 17 is a view similar in part to Fig. 16 but showing the rubber ball expanded and the pieces having assumed the shape of the inlay.

Fig. 18 is a sectional view illustrating the mold for final forming and curing, the preformed inlay being shown therein pressed against the wall of the mold by the expanded rubber bag carried by the cover of the mold.

Figure 4:
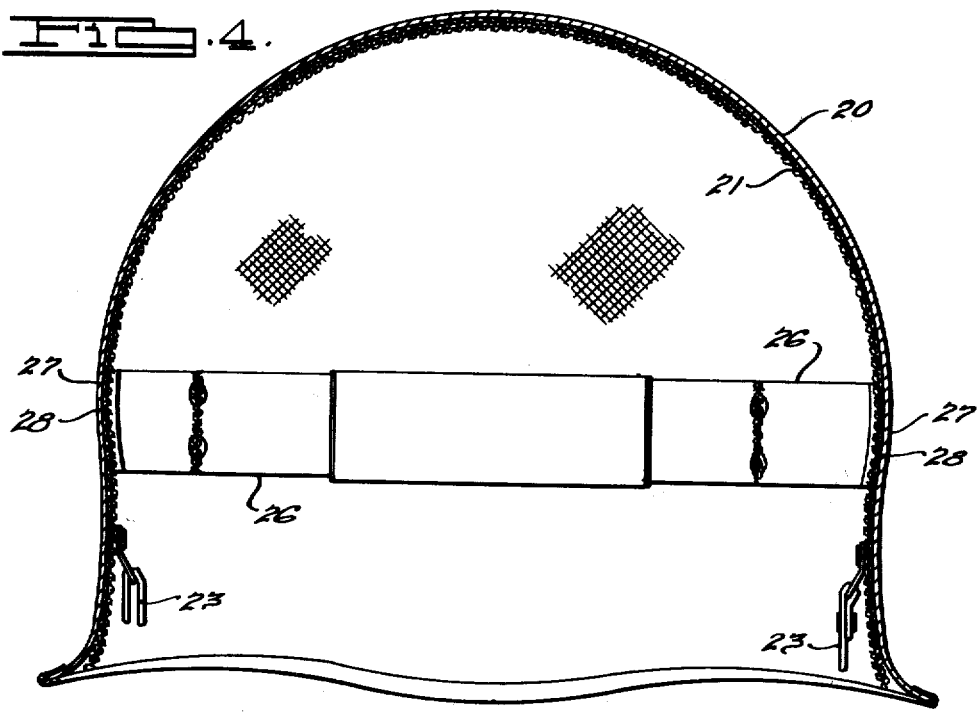
Fig. 4 is a vertical sectional view of the assembled helmet, said view being taken in the direction of the arrows on the section plane passing through the line 4—4 of Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is shown, by way of example, an improved military helmet of two-piece construction, including a liner or inlay made from plastic impregnated fabric or cloth. There is hereinafter described in detail and illustrated in the drawings an improved method of making various articles from plastic treated cloths, fabrics or felted fibers, and an improved apparatus for carrying out the molding or final forming and curing of such articles. Said improved method and apparatus are hereinafter disclosed as applied to making a plastic liner or inlay for a two-piece military helmet, shown in the drawings. It will be understood, however, that the present method and apparatus are not limited to making such inlays, but may be applied with equal success for making various other articles from the materials of the above general character, such for instance as parts of motor vehicle bodies, refrigeration cabinets, various sanitary articles and the like. It should also be understood that the term "plastic" as used herein includes various thermosetting and thermoplastic materials which may be used in connection with fabric or fiber reinforcements and molded by application of heat and pressure.

Referring now to Figs. 1 to 4 wherein the improved military helmet is illustrated, the same comprises an outside shell 20 made preferably by stamping from sheet steel. Within said helmet shell 20 there is fitted an inlay or liner generally indicated by the numeral 21. Within said inlay 21 there is secured in any suitable manner, such as with the aid of rivets 22, a supporting structure made of a plurality of interconnected straps and adapted to support said inlay on the wearer's head without permitting the inlay to contact the head of the wearer. The inlay is provided with an adjustable chin strap 23, while the shell 20 is similarly provided with a heavier chin strap 24 having a buckle 25 and suitable adjustment means. The inlay supporting structure or suspension generally indicated by the numeral 26 does not of itself form a part of the present invention and therefore no detailed description thereof is deemed necessary herein, this construction being clear from the drawings.

An important advantage of the helmet herein disclosed is found in the fact that, as can be clearly seen in Fig. 4, the middle portions 27 and 28 of the shell 20 and the inlay 21 respectively are made somewhat larger than the portions adjacent the edges thereof, and therefore some effort is necessary for forcing the inlay into the shell and for withdrawing said inlay therefrom. By virtue of such a construction easy separation of the shell and inlay under conditions of actual use is prevented. In accordance with the invention the same effect may also be produced by having the lower portion of the walls of the shell and inlay extend parallel to each other on both sides of the helmet and therefore insuring frictional contact between the inlay and the shell at or along large frictional surfaces. This will also prevent any undesirable movement or rocking of the steel shell on the inlay and thus will make the two-piece helmet in its fully assembled condition in effect a one-piece construction and yet will permit attainment of the advantages resulting from its laminated construction, such as the advantage of bullet deflection.

In accordance with the invention there is provided an improved method of making the helmet inlay 21 from plastic treated cloth or fabric as well as various fiber materials. In accordance with the improved method a suitable fabric or fiber material is first treated with plastic of any desirable or suitable character. Various commercially available thermoplastic or thermosetting plastic materials, such as thermoplastic resins, phenol formaldehyde, urea formaldehyde, synthetic resins, synthetic rubber, natural rubber, and the like may be used. Selection of the fabric material depends largely upon the character and use of the article to be made. For military helmet inlays it is preferable to use a closely woven cloth such as ordinary canvas.

In treating the canvas with plastic material which may be done either in any suitable machine or by hand, I prefer to cover with plastic material both surfaces of the canvas completely either by painting or spraying such surfaces. It is preferable to cover only the surfaces of the cloth without actually permitting the plastic material to penetrate through the entire thickness of the cloth and to surround the separate threads or fibers thereof. By virtue of such a treatment it is possible to apply a considerable amount of plastic material to the canvas or cloth and yet to preserve in the cloth a desired degree of softness necessary for proper folding of the cloth pieces in later stages of the inlay making. Such softness is retained by the canvas due to the fact that although the outside surfaces thereof after the plastic material solidifies become somewhat stiff or rigid, the inside of the cloth is still dry and separate fibers may move slightly with respect to each other and to adjust themselves in bending the cloth. It can be understood that should plastic material be driven between the separate fibers and threads into the entire thickness of the cloth as may be done by such plastic applying processes as rolling, after the plastic material solidifies, the separate fibers of the cloth are prevented from moving with respect to each other, and if bending or creasing of the cloth takes place along a particular line, extremely high stresses are imposed on separate fibers along that line, which may easily produce breaking of such overstrained fibers at said line. In actual molding such broken fibers and spaces between them are, of course, filled with plastic and cannot be noticed by an outside examination of the finished article, but nevertheless the strength of the cloth is thereby considerably reduced.

After application of the plastic material to the canvas, the same is dried in any suitable manner depending on the nature and character of the plastic material and may then be used for cutting therefrom pieces of desired outline. When application of the plastic material to the canvas is made on special machines by spraying, large rolls of such plastic treated canvas may be prepared, dried, and stored for later use.

Figure 5:
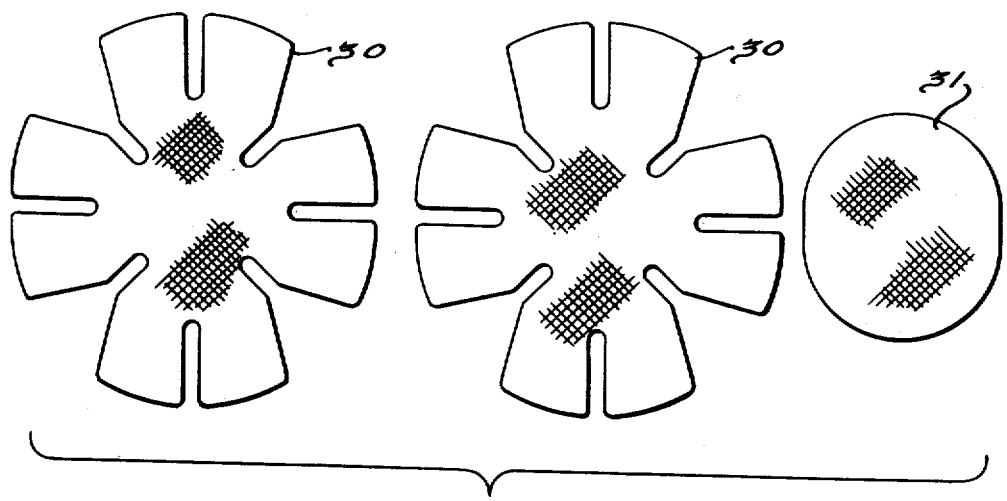
Fig. 5 is an exploded view showing a set of pieces cut out from plastic impregnated cloth from which pieces a plastic inlay is molded in accordance with the herein disclosed improved method.

Cutting out of pieces of desired outline from cloth may be done in any suitable manner such as with the aid of scissors or a knife, or with the aid of a suitable blanking die when a considerable number of layers of cloth may be arranged in a die and a corresponding number of pieces cut out in a single stroke of a press. The outline of the pieces cut out for making separate articles depends upon the shape thereof and the number of cloth layers used. In general, the outline of such pieces represents a developade or development surface of the article with some additional material along the seams or places of juncture thereof in order to produce overlapping seams. In addition, local reinforcement pieces may also be provided, outline of said pieces depending upon the character of the desired reinforcement. For the helmet inlay it is preferable to use two star-shaped pieces 30 and a top piece 31, as shown in Fig. 5.

Pieces 30 each representing substantially a development surface of the inlay 21, are folded on a form block 32 illustrated in Fig. 6 to an approximate form of the inlay, as shown in Fig. 7, and the seams are loosely connected in any suitable manner, such for instance as by touching them in places with a heated body such as a soldering iron or by sewing them together with weak thread easily broken. In the drawings such seams or places of juncture of the edges in pieces 30 are indicated by the numerals 33, and the pieces 30 after they are folded are designated by the numerals 34. Seams 33 after the connection therein is effected are additionally painted with the same plastic material in order to insure sufficient quantity thereof at said place of juncture.

Fig. 8 illustrates two folded pieces 34 and the head reinforcing piece 31 ready to be assembled. In assembly, the head piece 31 is put on the bottom of one of the pieces 34, and thereupon the second piece 34 is inserted into the first piece. It is desirable in the process of such assembly to stagger the seams 33 of pieces 34, thereby insuring a stronger construction.

After the pieces 34 and 31 are thus assembled, they are ready to be finally formed and cured in accordance with the present improved method. Such final forming and curing may be done either in a single step or operation or may be divided into a number of steps, such for instance as into a preforming operation and into the final forming and curing operation. If said final forming and curing is effected in a single operation, the same may be done in a mold illustrated in Fig. 9. Referring to said figure, the mold device illustrated therein comprises a base 36 adapted to receive a hollow dome 37, which dome is separable from said base and may be secured thereto with the aid of any suitable locking devices, such as devices 38. The forming portion of the dome 37 is formed by an actual helmet shell arranged within said dome. In order to indicate that such shell is a part of the actual helmet, the shell used in said dome is indicated by the numeral 20 used in Figs. 1-4 for designating the shell of the helmet shown therein. The shell 20 is fitted into the dome 37 in such a manner that it may be securely held therein. The shell may be supported in the dome in any suitable manner, such as by placing plugs between the shell 20 and the walls of the dome or by forming on the walls of said dome suitable lugs 39 which are shaped to contact the walls of the shell 20. The pressure exerting member of the molding device is exemplified by a rubber member or blanket 40 arranged on the base 36 and held in the assembled condition of the molding device between the base 36 and the edges of the dome 37 as can be clearly seen from an examination of Fig. 9. A live steam line 41 controlled by a suitable plug 42 and opening with a port 43 into a steam chamber 47 formed under the blanket 40, is provided for admitting live steam into the mold. Similarly for releasing the exhaust steam from the mold there is provided an exhaust steam line 44 controlled with the aid of a plug 45 and opening into the steam chamber with a port 46.

When the pieces 34 and 31 are assembled together as described and are ready to be molded, the dome 37 is removed from the base 36 and the assembled pieces are arranged over the upwardly extending middle portion of the blanket 40. Thereupon the dome 37 is placed over the blanket 40 and the assembled pieces, and is secured to the base 36 with the aid of the locking devices 38. Fig. 9 illustrates the assembled molding device with the pieces 34 and 31 arranged therein for final forming and curing. When the mold is so assembled with the pieces arranged therein, the live steam is then slowly admitted by opening the live steam plug 42 and letting the steam enter the chamber 47. The steam entering said chamber 47 heats the blanket 40 and slowly presses it against the assembled pieces 34 and 31 transferring to them by conduction the heat from the blanket 40. Because of heat the plastic material of the assembled pieces softens and as pressure within the chamber 47 increases, the assembled pieces yield to the pressure exerted thereon by the blanket 40, and being pressed by said blanket against the inner walls of the shell 20, they gradually assume the exact shape thereof. Due to the fact that seams 33 are somewhat loose, the edges of the pieces 34 separate in the process of such forming either because of the breaking of the weak threads used in sewing or by melting the spot connections produced by the soldering iron. Thus the cloth is permitted to rearrange itself in the process of molding without imposing any appreciable stresses and strains on the cloth material or fibers thereof. The plastic material being under such condition in its liquid form, internal adjustment of the fibers within separate pieces of cloth also takes place, and therefore the individual fibers under such conditions do not carry any appreciable loads as is the case when they are stretched in a single cloth piece which is being formed with the aid of a die punch of conventional method. By virtue of method the cloth retains its original strength and when the article is molded and the plastic solidifies, the fibers thereof are in a substantially unstrained condition which is not the case with articles produced in accordance with the above described conventional methods.

Another advantage of the present method of molding resides in the fact that pressure within the chamber 47 being equal in all directions, the blanket 40 presses on the assembled pieces uniformly in all directions, thereby permitting only necessary self-adjustment of cloth pieces without distorting their desirable arrangement. It will be understood that should such pieces be formed with the aid of a punch head moving into a forming portion of the die, unless a considerable draft or taper is provided on such walls, the punch may carry some pieces of cloth with it for an appreciable distance due to the friction between the stationary die walls and the movable punch walls with the cloth pieces between them. Such carrying of the pieces may completely disorganize their arrangement within an article and form wide gaps in the finished article, which gaps may, of course, be filled by the plastic and therefore make the defect of decreased strength thereof completely concealed from visual observation and detection.

It can also be understood from an examination of Fig. 9 that by virtue of using a fluid expanded resilient blanket, forms may be produced which could not be stamped with the aid of a conventional molding die because of the fact that a single acting punch cannot be withdrawn therefrom. An additional advantage of the present method resides in the fact that relatively low steam pressures may be utilized and give good results. As has been explained above, in conventional methods pressures such as 5000 pounds per square inch have been considered necessary for effecting proper molding of articles of this general character. With the present improved method selection of the proper pressure depends upon the character of the fabric material used. In small light articles where soft silk is used as the reinforcing material, such pressure may be very low, and in fact, 25 pounds per square inch may give satisfactory results. If on the other hand very heavy closely woven cloth is used in many layers and, in addition, the shape to be produced includes curvature of rather small radii, a higher pressure should be employed. For very smooth finishes higher pressures are also desirable. However, under ordinary conditions it is not necessary to use pressures above 1500 pounds per square inch. In fact, pressure of 1000 pounds per square inch is considered sufficient for rather severe conditions. Thus, with the present improved method the pressure such as indicated above is still five times as small as the average pressures used in conventional methods. In actual practice, however, a much lower pressure than 1000 pounds per square inch is desirable. With the cloth used for the helmet inlays pressures of 100 pounds per square inch gives very satisfactory results and such pressure is preferred.

With the use of the above described method using pressure of approximately 100 pounds per square inch, which pressure implies a corresponding definite temperature of the steam (wet or saturated), the time necessary to effect complete final forming and curing of average materials is approximately five to twenty minutes. With higher pressures and temperatures somewhat different duration of the forming and curing period may be desirable, and the same should be determined experimentally for the particular conditions and materials used.

After the forming and curing process is completed, the live steam plug 42 is closed and the exhaust plug 45 is opened to exhaust the steam and reduce pressure within the chamber 47. Thereupon the dome 37 is disconnected and removed from the base and the formed inlay blank is permitted to cool down. The inlay blank is then removed from the rubber blanket 40 and the rough edges thereof indicated by the numeral 47 of Fig. 11 are trimmed off in any suitable manner. The trimmed edges of the blank are additionally either treated with plastic material or covered with a suitable trimming strip. The blanket then assumes the form illustrated in Fig. 12. Thereupon the supporting structure 26 is riveted to the inlay blank and the chin strap is secured thereto. These operations complete the inlay and the same is now ready for use, either separately or in connection with the shell 20.

It will now be clear in view of the foregoing that in the apparatus described in Fig. 9 steam acts as both the pressure and the heating medium and heat is conducted to the inlay pieces through the blanket 40. Such method and apparatus is very simple and may be successfully used under many conditions.

In accordance with the invention it is also possible to separate the heating and the pressure functions and to employ different fluids for effecting such functions. For instance, while heating may be effected with the aid of steam under definite pressure and temperature, forming pressure may be attained pneumatically with the aid of compressed air. It will be understood however that the present invention is not limited to any particular type of the above mentioned fluids and that various other gaseous as well as liquid substances may also be used.

In Fig. 13 there is shown a molding device in which heating of the molded blank is effected with the aid of steam, while pressure thereon is produced pneumatically, which is to say, with the aid of compressed air. Generally, the structure of Fig. 13 differs from the structure of Fig. 9 only in that feature of its construction that in the mold of Fig. 13 only a compressed air line is provided in the base of the mold, while steam line is provided in the dome part thereof in order to admit steam between the walls of said dome and the helmet shell 20. Referring now to Fig. 13, the structure illustrated therein comprises a base 50 to which there is detachably connected with the aid of locking devices 51 a cover 52 of a box-like or other suitable shape. The shell 20 is arranged in said cover 52 in a way to form a steam chamber 53 between said shell 20 and the walls of the cover 52. A rubber blanket or bag 54 arranged similarly to the rubber blanket 40 of the structure of Fig. 9 is provided, said blanket being adapted to be expanded by compressed air delivered into the air chamber 55 formed within said rubber blanket or bag 54, through a suitable conduit 56. Live steam is delivered into the steam chamber 53 through a conduit 57 controlled with the aid of a suitable plug 58, while exhaust is effected through a conduit 59 controlled with a suitable plug 60. It should be understood that locations of the conduit controlling plugs such as 58 and 60 are shown in the drawing diagrammatically and for the purpose of simplicity adjacent the molding device, while in an actual device they may be located in any convenient place on the line and, in fact, may be brought together on a single control board for more convenient control of the device.

In operation, after the assembled inlay pieces 34 and 31 are arranged on the rubber bag 54 and the cover 52 affixed to the base 50, steam is first admitted into the chamber 53 to heat the shell 20, whereupon air is gradually admitted through the conduit 56 and the rubber blanket or membrane is caused to press the inlay pieces against the shell 20. After the forming and curing process is completed, the air and the steam lines are closed, and the exhaust conduit opened. Thereupon the mold is opened and the molded inlay blank removed therefrom as described above. With the above described construction any desired pressure may be attained without affecting the temperature of the steam. It should be understood that temperature of saturated and wet steam depends only upon the pressure thereof. In the structure of Fig. 13 very low pressure steam may be used for heating while higher pressures may be employed for expanding the bag 54 without increasing the curing temperature. By superheating the steam, higher temperatures may be attained without increasing the pressure of the steam which may be undesirable in molds of light construction.

Figure 14:
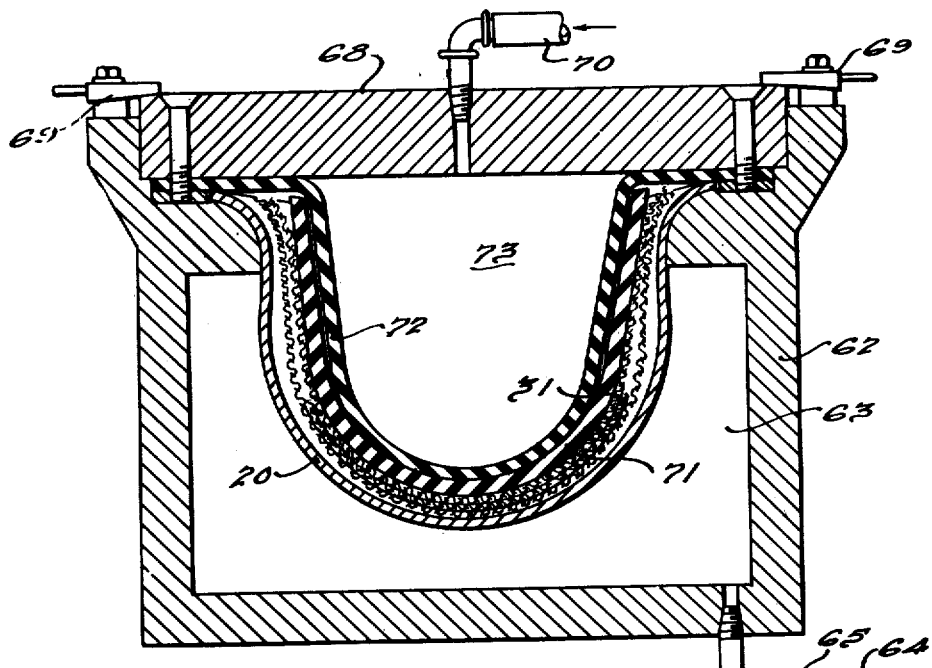
Fig. 14 illustrates a still further modification of the mold for curing such inlays, said mold being shown in vertical section.

Fig. 14 illustrates a molding device of a still further modified construction. The structure of Fig. 14 is constructed substantially on the same principle as Fig. 13, the difference lying mainly in the fact that in the structure of Fig. 14 the shell 20 is arranged in the base of the device and therefore the inlay blank or the assembled pieces for forming the same are arranged within the shell 20 as they are put in the mold rather than assembled on the rubber bag as is done in the structures of Figs. 9 and 13. Referring now more particularly to Fig. 14, the structure illustrated therein comprises a base 62 of a box-like or any other suitable shape, having a steam chamber 63 formed between its walls and the shell 20. The steam is admitted into the chamber 63 from the line 64 by opening a plug 65 thereof and is exhausted through the line 66 by opening a plug 67 thereof. A cover 68 detachably secured to the base 62 with the aid of a number of locking devices 69 has an air line 70 provided therein. In operation, the steam under relatively low pressure may be constantly admitted into the chamber 63 for heating the shell 20. The assembled inlay pieces are first arranged within the shell 20 and thereupon a floating rubber member 71 is placed within said pieces. Next, the rubber bag 72 is arranged within said floating rubber member 71, and the cover 68 is put in place and secured to the base 62. Air is then admitted into the air chamber 73 formed by the rubber bag 72 and the cover 68, in order to press the floating rubber member 71 and the assembled inlay pieces against the heated walls on the shell 20. By the provision of the floating member 71 a somewhat better and easier self-arrangement of the cloth pieces in forming is permitted, which is important if particularly smooth finishes are desirable.

It will be understood that with the structures illustrated in Figs. 9, 13 and 14, the outside surface of the molded inlay will come out smooth, while the inside thereof will exhibit the roughness of the cloth. If smooth surface is desired on the inside rather than the outside of an article, it is molded against the outside of the form. A molding apparatus for an article of a plate shape and producing smooth surface on the inside thereof is illustrated in Fig. 15, said apparatus being constructed similar to the molding apparatus of Fig. 14.

Figure 15:
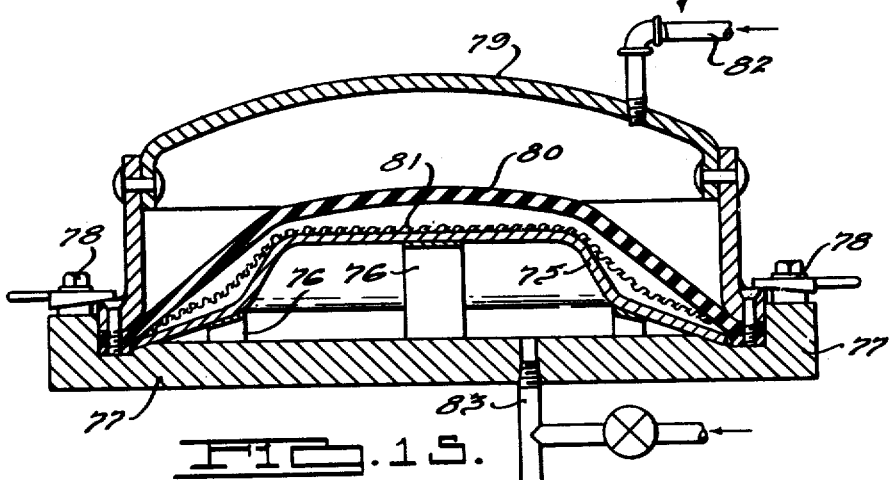
Fig. 15 shows a mold for molding an article with smooth inside surface, said mold being shown in vertical section.

In the structure of Fig. 15 the form 75 of sheet metal is supported by lugs 76 on the base 77 to which is detachably secured with the aid of locks 78 a cover 79. A rubber membrane 80 is held in the assembled condition of the molding device between the base 77 and the cover 79 is adapted to be pressed by air pressure against the workpiece 81, pressing the same against the form 75. Pressure within the cover is created by admitting air therein through a line 82, while steam is admitted into the steam chamber formed under the form 75, through a steam line generally indicated by the numeral 83 and similar in its construction to the steam line system of the structure shown in Fig. 14.

Figs. 16, 17 and 18 illustrate a modified type of the apparatus in which the step or operation of the final forming and curing is effected in two stages: first, by preforming the article in the device of Figs. 16 and 17 and thereupon finally forming and curing the same in the device illustrated in Fig. 18.

The preforming device illustrated in Figs. 16 and 17 comprises a base 85 adapted to receive a shell 20, which shell may be easily inserted in place and removed therefrom by getting hold of the edges thereof at recesses provided at the upper edges of the base, such as at recesses 86. Within the base 85 there is arranged a steam coil 87 controlled by plugs 88 and 89, said steam coil arranged so that it comes in close proximity to the shell 20 when the same is inserted into the base 85. An electric coil may also be used. A cover 90 carrying a rubber ball 91 is adapted to be placed over the base 85. The rubber ball 91 may be expanded by admitting air under pressure therein through a conduit 92 controlled by a plug 93. In operation, the assembled inlay pieces 34 and 31 are first arranged in a shell 20 before the same is inserted into the base 85 as shown in Fig. 16, and the cover 90 together with the rubber ball 91 carried thereby is placed over the base, with the rubber ball entering the assembled inlay pieces. Air is then slowly admitted into the ball 90 expanding the same as shown in Fig. 17. Due to the action of the heat supplied by the steam coil, the plastic material with which the pieces 34 and 31 are treated, softens sufficiently to permit the rubber ball to preform the inlay pieces and to impart to them the form of the inlay. After the inlay blank is so preformed, the cover 90 is removed and the shell 20 together with the inlay blank contained therein is transferred into the mold illustrated in Fig. 18.

The molding device shown in Fig. 18 comprises a base 95 provided with a shell receiving recess 96 and a steam chamber 97 into which steam is admitted through a live steam line 98 and exhausted through an exhaust line 99. A cover 100 has secured thereto in any suitable manner a rubber bag 102. In the present embodiment of the invention the bag 102 is held against said cover by a ring 103 engaged by screws 101. The cover 100 is detachably secured to the base 95 with the aid of locks 104. An air line 105 is arranged in the cover, and the entire cover is suspended on a pulley 106 with the aid of a cord or cable 107 having on its free end a counterbalancing weight 108. In operation, the cover 100 is first removed and the shell 20 together with the preformed inlay blank contained therein is transferred from the molding device illustrated in Figs. 16 and 17 into the shell receiving recess 96 of the mold of Fig. 18. The cover 100 is then brought over the base 95 and the rubber bag 102 inserted into the inlay blank. The cover 100 is next secured to the base 95 with locks 104. Thereupon the air is admitted through the line 105 into the air chamber 109 formed in the rubber bag 102, whereby said air bag is caused to expand and to press against the preformed inlay blank, pressing the same against the inner walls of shell 20. The preformed blank is then kept under heat and pressure as long as the plastic material and the canvas require. After the forming and curing process is completed, the shell 20 is removed from the base 95 by first removing the cover 100 therefrom, and is transferred to another station for removal of the finally formed blank. Thus the mold may be continuously used without delays necessary to remove the blank from the shell. With the apparatus illustrated in Figs. 16, 17 and 18 a somewhat faster production may be obtained.

In the molding devices herein illustrated and described, the pressure producing member is in the form of a fluid expanded rubber member. It will be understood, however, that under certain conditions it may be practical to use a solid rubber member and to apply mechanical pressure thereto, causing the rubber "to flow" and to apply pressure to a blank. With the use of such members much greater pressures may be attained. If a member of this general character is employed, the shape of it should be approximating the shape of the article to be molded somewhat closer than it is necessary when a fluid expanded bag is employed.

It will now be understood in view of the foregoing that an additional advantage of the above described method and apparatus is also due to the fact that presence of high spots, such as those found at overlapping seams, does not result in producing in molding excessively high localized pressures. In the conventional die molds, the punch of the die first contacts such high spots and until they are crushed, no molding pressure can be exerted on the low spots of the mat or blank. In the process and apparatus of the present invention the resilient pressure member "absorbs" such high spots and exerts equal pressures both on the high and low spots of the blank, whereby crushing of fibers at such high spots is prevented.

A number of modifications may be effected in the above described method and apparatus without departing from the scope of the present invention. For instance, steam may be used in molds similar to those illustrated in Figs. 13, 14, 15 and 18 both for heating the shell 20 and expanding the rubber member. It should also be understood that the term "rubber" as is used in both the specification and the following claims includes natural as well as synthetic rubber, and also any rubber-like or resilient material suitable for the purposes described.

Under certain conditions it is desirable to cut the pieces from the fibrous material before it is treated with plastic, and to apply such plastic onto the pieces either by painting or spraying the plastic in liquid or powder form after the pieces are so cut out, or even after they are folded to the approximate shape of the article or assembled in the mold.

In cases where smoother finish is desirable, the floating member 71 of the apparatus shown in Fig. 14 may be made of smooth material such as oil cloth, cellophane and the like, thus producing a somewhat smoother finish than is produced by rubber actually contacting the blank.

There is thus provided an improved method and apparatus whereby various articles made of fabric reinforced plastic materials or plastic treated fabrics and fiber materials may be molded with the use of relatively low pressures and with the aid of inexpensive apparatus, whereby objects of the present invention listed above and numerous additional advantages are attained.

I claim:

1. A method of making a safety helmet from flat plastic impregnated substantially unstretchable fabric material, said method comprising the steps of providing from said material a plurality of pieces, each of said pieces substantially corresponding to the development of the helmet but being larger in area to ensure substantial overlapping of its meeting edges when folded to the shape of the helmet and molded, folding each of said pieces to an approximate shape of the helmet with edges of the fabric of the same piece overlapping each other for a substantial distance; assembling said pieces together to form a laminated preform; placing such preform into a heated mold and pressing it against the hot surface of said mold with the aid of a rubber member adapted to absorb the unevenness in the thickness of the walls of the preform produced by the overlapping edges in the preform and thus to exert substantially uniform pressure on all points thereof; and, leaving said preform in the mold under the resilient pressure of said rubber member for a predetermined time to cure the plastic.

2. In a method of making from plastic impregnated fabric a hollow laminated article, its hollow being at least in one place larger than the largest aperture in the article wall, the steps of providing from said material a plurality of pieces, each piece being a development of at least a portion of the article surface but having additional material along its meeting edges in order to ensure their substantial overlapping when the piece is folded to the shape of the article surface and molded; folding said pieces and assembling them together to form a laminated preform; placing said preform into a curing mold; introducing into said preform an expandable rubber member and expanding the same to press the preform against the walls of the mold, contracting the rubber member and withdrawing it from the hollow article after the plastic is cured.

3. A method of making from plastic impregnated substantially unstretchable fabric material of hollow articles including relatively deep curved draws, said method comprising the steps of providing from said material a plurality of pieces each having an area larger than the development of the corresponding area of the article in order to ensure substantial overlapping of the meeting edges of said development when folded to the shape of the article surface and molded; so folding each of said pieces and assembling them to form a laminated preform; placing said preform into a heated mold; and, pressing it against the walls of said mold with the aid of an expandable rubber member, and leaving said preform in the mold under the resilient pressure of said rubber member for a predetermined time to cure the plastic.

4. In a method of making from flat plastic impregnated cloth of a hollow article including curved walls, the steps of cutting from said cloth a piece forming substantially a development of said article with additional cloth being provided on said development at least at some of the edges thereof intended to meet when said development is folded to the shape of the article, the amount of such additional cloth being sufficient to ensure substantial overlapping of said edges both when the development is folded as well as after the same is molded, folding said development to the approximate shape of the article to make a preform, and molding said preform in a mold under the pressure of a rubber member adapted to absorb the high spots formed at the overlapping edges of the preform and thus to exert substantially uniform pressure on all points thereof.

5. In a method of making from flat plastic treated cloth of a hollow article including curved surfaces, the steps of cutting from said cloth at least one piece forming substantially a development of the surface of said article with additional cloth being allowed on said piece at the edges thereof adapted to meet when said development is folded, the amount of such additional cloth being sufficient to ensure overlapping of such meeting edges for a substantial distance both when the development is folded as well as after the same is molded, folding said development to the approximate form of the surface of said article with its meeting edges overlapping each other to make a preform, and molding said preform in a heated sheet metal mold under the pressure of a rubber member adapted to absorb the high spots formed at the overlaps of said meeting edges and, thus, to exert substantially uniform pressure on all points of said preform.

6. In a method of making from flat plastic impregnated cloth of a hollow article including curved surfaces, the steps of cutting from said cloth a piece forming substantially a development of at least a portion of the surface of said article with additional cloth being allowed on said piece at the edges thereof adapted to meet when said development is folded, the amount of such additional cloth being sufficient to ensure overlapping of such meeting edges for a substantial distance both when the development is folded as well as after the same is molded, folding said development to the approximate form of the surface of said article to make a preform with its meeting edges overlapping each other, and molding said preform in a steam heated mold under the pressure of a water-expandable rubber member adapted to absorb the high spots formed at the overlaps of said meeting edges and, thus, to exert on said overlaps substantially the same pressure as on other points of said preform.

LE GRAND DALY.

REFERENCES CITED

The following references are of record in the file of this patent:

UNITED STATES PATENTS

| Number | Name | Date |
| --- | --- | --- |
| 1,213,051 | Wickes | Jan. 16, 1917 |
| 2,123,275 | Dym | July 12, 1938 |
| 535,773 | Rowley | Mar. 12, 1895 |
| 1,343,185 | Kendall | June 8, 1920 |
| 1,589,464 | Frederick | June 22, 1926 |
| 2,328,992 | Nielsen | Sept. 7, 1943 |
| 1,912,931 | Clay | June 6, 1933 |
| 2,308,453 | Potchen | Jan. 12, 1943 |
| 1,475,623 | Edgerton | Nov. 27, 1923 |
| 1,839,436 | Wood | June 5, 1932 |
| 1,640,543 | Gudge | Aug. 30, 1927 |

---

Certificate of Correction

Patent No. 2,420,522.

May 13, 1947.

LE GRAND DALY

It is hereby certified that error appears in the printed specification of the above numbered patent requiring correction as follows: Column 3, line 49, beginning with the words "In making" strike out all to and including the syllable and period "posals." in line 26, column 4, and insert the same in column 2, line 3, before the sentence beginning with "One of"; and that the said Letters Patent should be read with this correction therein.

Signed and sealed this 22nd day of July, A. D. 1947.

[SEAL]

LESLIE FRAZER,
*First Assistant Commissioner of Patents.* under the pressure of a rubber member adapted to absorb the high spots formed at the overlapping edges of the preform and thus to exert substantially uniform pressure on all points thereof.

5. In a method of making from flat plastic treated cloth of a hollow article including curved surfaces, the steps of cutting from said cloth at least one piece forming substantially a development of the surface of said article with additional cloth being allowed on said piece at the edges thereof adapted to meet when said development is folded, the amount of such additional cloth being sufficient to ensure overlapping of such meeting edges for a substantial distance both when the development is folded as well as after the same is molded, folding said development to the approximate form of the surface of said article with its meeting edges overlapping each other to make a preform, and molding said preform in a heated sheet metal mold under the pressure of a rubber member adapted to absorb the high spots formed at the overlaps of said meeting edges and, thus, to exert substantially uniform pressure on all points of said preform.

6. In a method of making from flat plastic impregnated cloth of a hollow article including curved surfaces, the steps of cutting from said cloth a piece forming substantially a development of at least a portion of the surface of said article with additional cloth being allowed on said piece at the edges thereof adapted to meet when said development is folded, the amount of such additional cloth being sufficient to ensure overlapping of such meeting edges for a substantial distance both when the development is folded as well as after the same is molded, folding said development to the approximate form of the surface of said article to make a preform with its meeting edges overlapping each other, and molding said preform in a steam heated mold under the pressure of a water-expandable rubber member adapted to absorb the high spots formed at the overlaps of said meeting edges and, thus, to exert on said overlaps substantially the same pressure as on other points of said preform.

LE GRAND DALY.

REFERENCES CITED

The following references are of record in the file of this patent:

UNITED STATES PATENTS

| Number | Name | Date |
| --- | --- | --- |
| 1,213,051 | Wickes | Jan. 16, 1917 |
| 2,123,275 | Dym | July 12, 1938 |
| 535,773 | Rowley | Mar. 12, 1895 |
| 1,343,185 | Kendall | June 8, 1920 |
| 1,589,464 | Frederick | June 22, 1926 |
| 2,328,992 | Nielsen | Sept. 7, 1943 |
| 1,912,931 | Clay | June 6, 1933 |
| 2,308,453 | Potchen | Jan. 12, 1943 |
| 1,475,623 | Edgerton | Nov. 27, 1923 |
| 1,839,436 | Wood | June 5, 1932 |
| 1,640,543 | Gudge | Aug. 30, 1927 |

---

Certificate of Correction

Patent No. 2,420,522.     May 13, 1947.

LE GRAND DALY

It is hereby certified that error appears in the printed specification of the above numbered patent requiring correction as follows: Column 3, line 49, beginning with the words "In making" strike out all to and including the syllable and period "posals." in line 26, column 4, and insert the same in column 2, line 3, before the sentence beginning with "One of"; and that the said Letters Patent should be read with this correction therein.

Signed and sealed this 22nd day of July, A. D. 1947.

[SEAL]

LESLIE FRAZER,
*First Assistant Commissioner of Patents.*